UNITED STATES PATENT OFFICE.

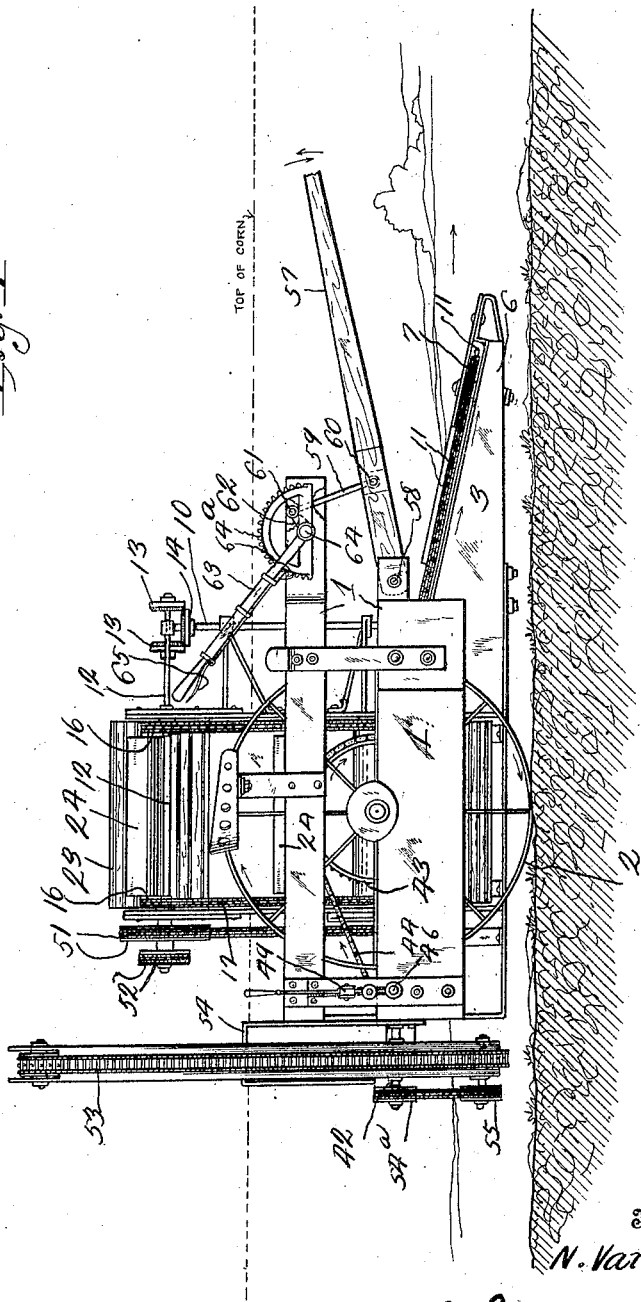

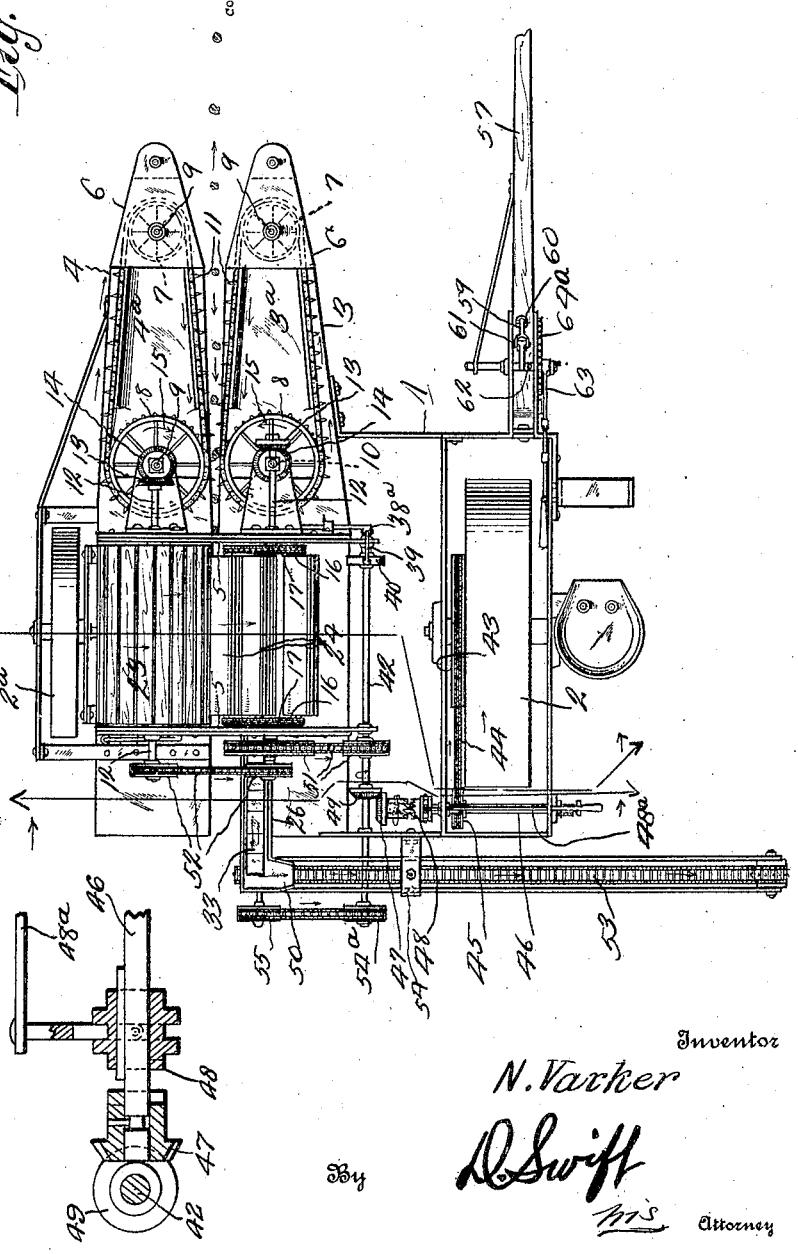

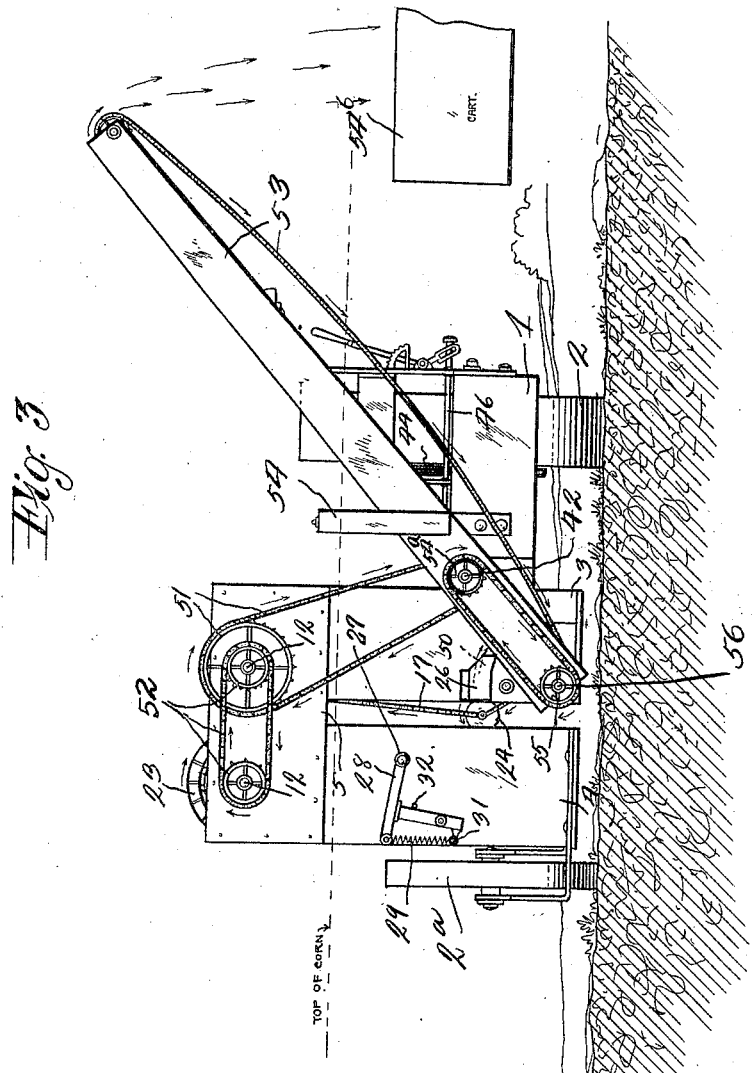

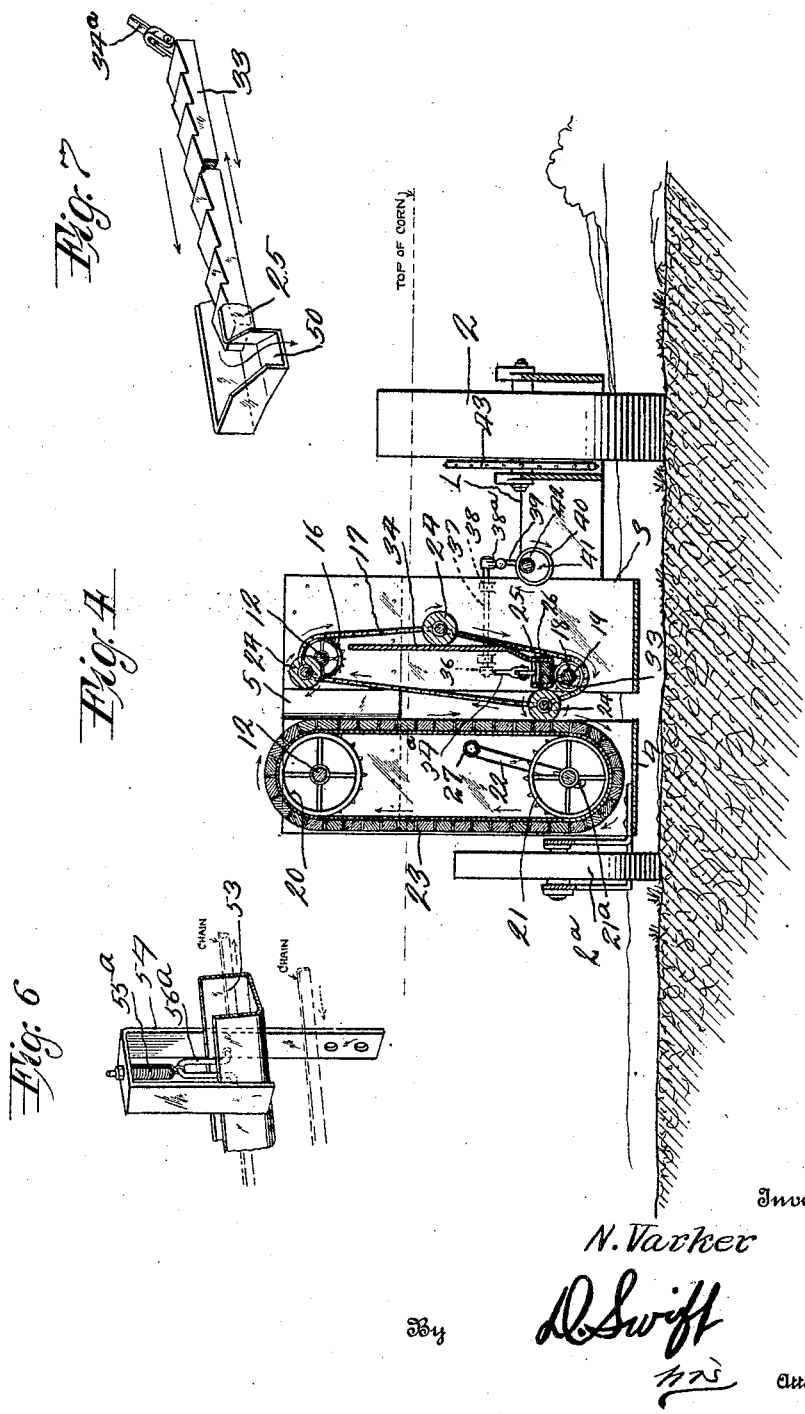

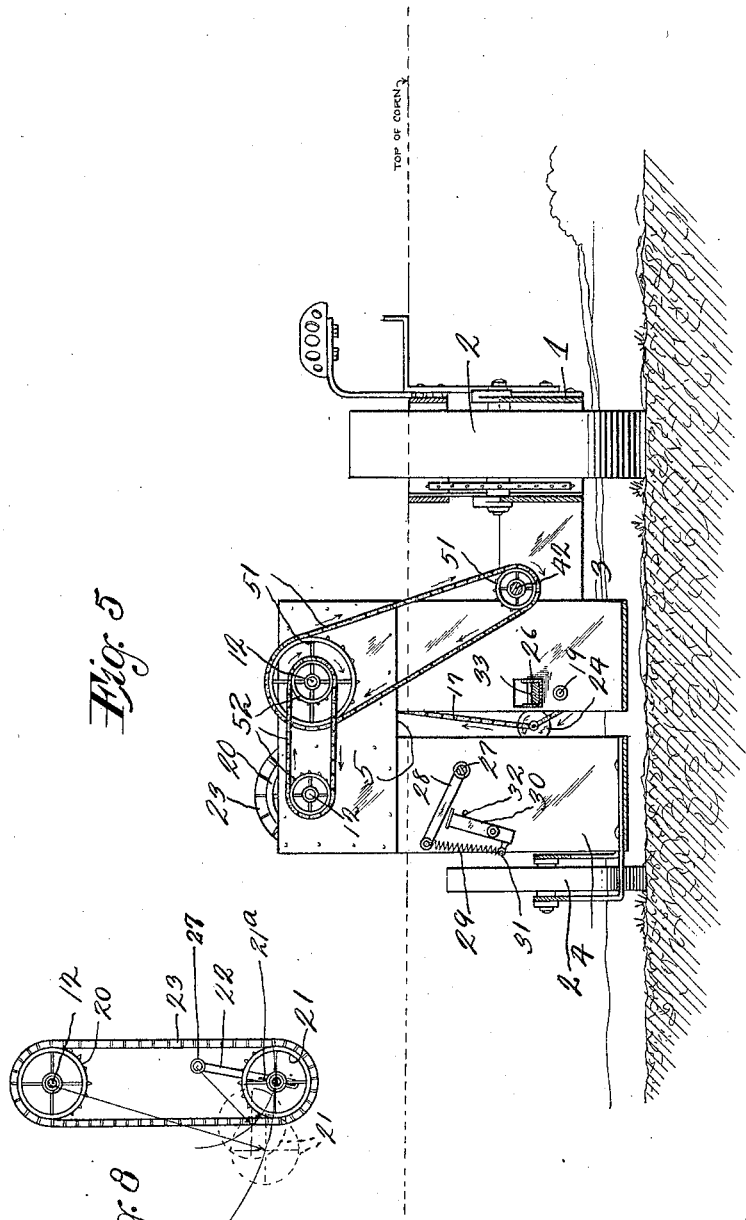

NEWTON VARKER, OF CUBA, WISCONSIN.

CORN HARVESTER.

1,404,813.  Specification of Letters Patent.  Patented Jan. 31, 1922.

Application filed August 19, 1919. Serial No. 318,545.

*To all whom it may concern:*

Be it known that I, NEWTON VARKER, a citizen of the United States, residing at Cuba, in the county of Grant, State of Wisconsin, have invented a new and useful Corn Harvester; and I do hereby declare the following to be a full, clear, and exact description of the invention, such as will enable others skilled in the art to which it appertains to make and use the same.

The invention relates to corn harvesters and has for its object to provide a machine of this type wherein the machine will straddle a row of corn, and as the machine moves forwardly, endless chains having fingers, will straighten upwardly the stalks that may be inclined, and as the machine further moves forwardly, the stalk will pass between means which will pull the corn in its husk from the stalk, said corn and husk being deposited by the pulling mechanism on a rearwardly extending conveyor, said conveyor depositing the corn on a second conveyor. The second conveyor extends outwardly from the machine, at a right angle thereto and has its upper end disposed spaced from the ground so that the corn in their husks may be deposited in a wagon driven beside the corn harvester and under said end of the conveyor.

A further object is to provide a mechanism for breaking the ears of corn from the stalk comprising a vertically disposed and resiliently supported breaker apron and an endless chain belt having a series of rollers, said rollers being adapted to engage and cooperate with the resiliently supported apron, between which rollers and the apron the corn stalk passes so that as the roller passes upwardly the ear of corn will be broken from the stalk and deposited in a conveyor. Also to provide eccentric means, whereby the conveyor will be oscillated so that the ears of corn will gradually move rearwardly to the right angle conveyor.

A further object is to provide near the forward end of the machine a lever, said lever having a link connection with the tongue of the machine whereby the machine may be inclined at different angles.

A further object is to provide means whereby the mechanism of the machine will be operated by a sprocket at one of the wheels of the machine, also to provide means whereby the movement of the mechanism may be dispensed with when the machine is being moved from place to place.

With the above and other objects in view the invention resides in the combination and arrangement of parts as hereinafter set forth, shown in the drawings, described and claimed, it being understood that changes in the precise embodiment of the invention may be made within the scope of what is claimed.

In the drawings:—

Figure 1 is a side elevation of the machine.

Figure 2 is a plan view of the machine showing the same straddling a row of corn.

Figure 3 is a rear view of the machine.

Figure 4 is a transverse sectional view through the machine taken on line 4—4 of Figure 2.

Figure 5 is a sectional view taken on line 5—5 of Figure 2.

Figure 6 is a perspective view of the right angle conveyor support showing its resilient supporting means.

Figure 7 is a detail perspective view of the shaker conveyor and its guide.

Figure 8 is a detail view of the endless holding apron.

Figure 9 is a detail view of the clutch mechanism for controlling the power from the wheel to the various mechanisms.

Referring to the drawings, the numeral 1 designates the frame and 2 a tractor wheel journalled therein. The inner side of the frame is connected to casings 3 and 4, said casing being connected together by transverse members 5. The forward ends 6 of the casings 3 and 4 have journalled in bearings thereon sprockets 7 and 8, said sprockets being carried by vertically disposed shafts 9 and 10 and around said sprockets 7 and 8 endless chains pass, said chains being provided with fingers 11 adapted to engage the stalks of corn thereby straightening any stalks that may be inclined so that said stalks will pass through the machine in substantially a vertical position. Power is transmitted to the sprockets 8 for moving the endless chains having the fingers 11 thereon so that their adjacent sides will move in the same direction through longitudinally disposed shafts 12, said shafts having secured thereon to the forward ends thereof bevel gears 13, which bevel gears mesh with bevel gears 14 carried by the upper end of the vertical shafts 9 and 10. It will be seen that bevel gears 13 are disposed on opposite sides of the bevel gears 14, thereby causing the sprockets 8 to revolve in the direction of the arrows 15 so that the sprocket chains will move in the same direction, that is where they are adjacent each other. Shafts 12 extend rearwardly through the transverse members 5 and have bearings therein. One of said shafts 12 being provided with sprockets 16 and around said sprockets, sprocket chains 17 extend, which sprocket chains also extend around sprockets 18 secured to a shaft 19, which shaft is rotatably mounted in bearings of the casing 3. The other shaft 12 is provided with sprockets 20 and around said sprockets 20 and sprockets 21 rotatably mounted in bearings of pivoted arms 22 is a flexible apron 23, said apron being adapted to co-operate with transversely disposed rollers 24 carried by the endless chains 17 so that as the roller 24 passes upwardly and a stalk is between said roller and the apron, said roller will come in contact with an ear of corn and dislodge the same by breaking the ear from the stalk. However, as the rollers 24 ride over the edge 25 of the conveyor casing 26, said roller is forced inwardly into close engagement with the stalk, so that it will roll up said stalk until is engages the ear of corn. During this inward movement of the roller 24, the lower end of the apron 23 is allowed to pivot outwardly at its lower end through the medium of the pivoted arm 22, which arm is rigidly secured to a shaft 27, said shaft being rotatably mounted in a bearing of the casing 4 and is provided with angular arm 28, to the end of which a coil spring 29 is secured. The other end of the coil spring being connected to a pivoted arm 30 as at 31, said arm 30 being limited in its pivotal movement by a stop lug 32, the upper end of the pivoted arm 30 being adapted to be engaged by the arm 28 so that said arm may be limited in its movement and consequently limiting the inward movement of the lower end of the apron 23.

It will be seen that no matter how thick the stalk may be, nor how thick the ears may be that the endless apron 23 will move outwardly at its lower end to accommodate itself to the thickness of the stalk or ear. By referring to Figure 8, it will also be seen that by providing the elongated bearing 21ª in the lower end of the arm 22, that the inner side of the apron will be allowed to move inwardly so that it can conform to the contour of the side of the stalk without frictionally binding against the same. By providing the elongated bearing 21ª the sprocket wheels 21 will be allowed to move upwardly so that it will swing outwardly on various arcs according to contour of the sides of the stalk or the ear.

After the roller 24 has broken the ear from the stalk, the ear falls into a shaking conveyor 33, which is guided in its longitudinal movement in the casing 26, said casing being provided with a vertically disposed shield 34 which prevents the ear of corn from passing over the top of the conveyor and assures the dropping of the corn onto the conveyor 33. The conveyor 33 has connected to the forward end thereof a link 34ª, said link extending forwardly and upwardly and is secured as at 36 to a rockable shaft 37, said shaft 37 being mounted in bearings 38 of the casing 6. The outer end of the shaft 37 is provided with offset ears 38ª between which ears an arm 39 of an eccentric band 40, is connected. Eccentric band 40 has rotatably mounted therein an eccentric 41, which eccentric is secured on a rotatable shaft 42, said shaft being rotatably mounted in bearings in the frame casing 3.

The corn harvester frame is provided with a wheel 2ª at the opposite side to the wheel 2, however, power is transmitted from the wheel 2 through the sprocket 43 and sprocket chain 44. Sprocket chain 44 in turn passing over a sprocket 45 carried by a transversely disposed shaft 46. The outer end of the shaft 46 has loosely mounted thereon a bevel gear 47, however, bevel gear 47 is caused to rotate with the shaft when the spline clutch 48 is thrown into operation by means of the controlling lever 48ª. When the clutch 48 is thrown in, bevel gear 47 meshes with a bevel gear 49 secured on the shaft 42, rotating said bevel gear 49 and consequently rotating shaft 42 which will cause the eccentric to operate the shaker conveyor, so that the ears of corn will be worked rearwardly to the outlet end 50 of the casing 25. Shafts 12 are rotated from the shaft 42 through chain and sprocket connections 51 and 52. By means of this chain and sprocket connection it will be seen that the inner wall of the apron 23 will move downwardly and that the inner wall or portions of the sprocket chain 17 will move upwardly thereby causing a pull upwardly under the ear of corn by the roller, at the same time that a downward pull is being imparted to the stalk. This downward pulling on the stalk by the apron will prevent the uprooting of the stalk as the roller is bearing the ear from the same, thereby leaving the stalk intact in the ground.

Shaft 42 at its rear end passes through an inclined conveyor 53, which conveyor is disposed under the discharge end 50 of the shaker conveyor 33 and extends upwardly and outwardly at right angle to the direction of movement of the machine. Shaft 42 extends through the walls of the conveyor 53 and is provided with a sprocket 54ª; said sprocket 54ª has a sprocket chain extending around it and around the sprocket 55, mounted on a drive shaft 56 at the lower end of the conveyor, said sprockets and chain forming means whereby the shaft 56 will be rotated and consequently the conveyor 53, so that as the ears are deposited on the conveyor 53 they will be conveyed upwardly and finally deposited in a cart 54$^b$ which is drawn by horses or other power and is adapted to move along the row of corn in parallel relation to the harvesting machine. During the forward movement of the machine it is obvious that there would be considerable springing action on the conveyor 53 and to take the strain of this action the supporting bracket 54 for the conveyor 53 is provided with a coil spring support 55$^a$, the lower end of which spring is connected to a U-shaped link 56$^a$, said U-shaped link being in turn connected to the conveyor frame. It will be seen that as the harvester moves over the ground that the strain on the conveyor 53 will be taken up by the spring 55$^a$. A tongue 57 is pivoted to the forward end of the machine as at 58, and by means of this pivotal connection of the tongue, the casings 3 and 4 may be moved nearer to the ground or further from the ground as desired for extremely low corn or corn that becomes inclined from wind or weather conditions. To accomplish this upward and downward movement of the forward ends of the casings 3 and 4, a link 59 is pivoted to the tongue as at 60 the other end of the link being pivoted as at 61 to an arm 62 of lever 63, said lever being pivoted to the frame 1 as at 64. It will be seen that by moving the lever 63 in one direction or the other that the pivotal point 58 will be moved upwardly or downwardly for the reason that the weight is on the draft animal through the medium of the tongue therefore the forward end of the tongue will not move and consequently the pivotal point 58 will move upwardly or downwardly according to the direction of movement of the lever 63. Lever 63 is maintained in position to which it has been moved by means of the dog and rack 64$^a$ which interengage, said dog being controlled by a hand grip 65.

Corn ears that may be caused to break and drop from the stalks as the same are being straightened to a substantially vertical position by the fingers 11, will fall into the compartments 3$^a$ and 4$^a$ of the forward ends of the casings 3 and 4, thereby preventing the dropping of the same on the ground and consequent loss of this easily broken corn.

The corn stalks pass between the casings 3 and 4, thence backwardly under the front transverse member 5, in which position the quickly moving roller 24 comes around engaging one side of the stalk forcing said stalk against the resiliently pivoted lower end of the apron, which apron is moving in the opposite direction to the roller 24 thereby holding the stalk and preventing the roller from uprooting the stalk when it moves upwardly into engagement with the ear of corn and breaks said ear from the stalk. The ear having been broken from the stalk drops into the shaker conveyer 33, it gradually moves rearwardly over said shaking conveyor and is deposited on the conveyor 53. Conveyor 53 elevates the ears of corn and deposits the same into a wagon which is driven along side the harvester and under the conveyor.

The invention having been set forth what is claimed as new and useful is:—

1. A corn harvester comprising a wheel supported frame, said frame being provided at its forward end with endless chains between which the stalks pass and by which the stalks are moved to an upright position, a breaking mechanism for breaking the corn ears from the stalk disposed behind the straightening mechanism, said breaking mechanism comprising an endless belt apron vertically disposed, vertically disposed endless chains opposite the endless belt apron, said chains being provided with rollers, said apron and the rollers carried by the chains being so disposed that the stalks of corn will pass there between, means whereby the rollers will move inwardly against the stalk and roll upwardly thereon, the lower end of the apron conveyor being free to move outwardly against the action of a spring thereby holding the stalk against being uprooted during a breaking operation of the roller, a conveyor passing through the endless chains and means whereby power will be imparted from one of the supporting wheels of the frame for operating the straightening chains, the breaking mechanism and the longitudinal conveyor.

2. A corn harvester having at its forward end means for straightening up the stalks as the machine advances, said means comprising continuously moving fingers on each side of the row for engaging the stalks, a mechanism located behind the straightening means for breaking the ears from the stalks, said mechanisms comprising spaced pairs of vertically disposed endless belts, one of said pairs of belts being provided with stalk engaging and ear removing rollers, the other belt moving downwardly in engagement with the stalk, thereby preventing the uprooting of the stalk as the rollers break the ear from the stalk, and means whereby the broken ears will be conveyed from the machine.

3. A corn harvester having at its forward end means for straightening up the stalks as the machine advances, said means comprising continuously moving fingers on each side of the row of corn for engaging the stalks, a mechanism located behind the straightening means for breaking the ears from the stalks, said mechanism comprising spaced pairs of vertically disposed endless belts, one of said pairs of belts being provided with stalk engaging and ear removing rollers, the other belt moving downwardly in engagement with the stalk, thereby preventing the uprooting of the same as the rollers break the ears from the stalk, the lower end of the downwardly moving pair of belts being resiliently mounted against the action of a spring thereby preventing excessive pressure against the stalk and at the same time allowing the stalk to be grasped between the rollers and the downwardly moving pair of belts and means for imparting power to the straightening mechanism and breaking mechanism.

4. A corn harvester having at its forward end means for straightening up the stalks as the machine advances, said means comprising continuously moving fingers on each side of the row for engaging the stalks, a mechanism located behind the straightening means for breaking the ears from the stalks, said mechanism comprising spaced pairs of vertically disposed endless belts, one of said pairs of belts being provided with stalk engaging and ear removing rollers, the other belt moving downwardly in engagement with the stalk, thereby preventing the uprooting of the stalk as the rollers break the ears from the same, a conveyor passing longitudinally through the roller carrying belts and so disposed that as the ears are broken from the stalk the same will drop into the conveyor and means whereby power from one of the wheels of the harvester may be utilized for operating the straightening mechanism, the breaking mechanism and the longitudinal conveyor.

5. A wheel supported corn harvester having at its forward end means for straightening up the stalk as the machine advances, means at the forward end of the machine adjacent the straightening means for collecting the ears of corn that may become dislodged from the stalks during the straightening operation, a mechanism located behind the straightening means for breaking the ears from the stalks, said mechanism comprising spaced pairs of vertically disposed endless belts, one of said pairs of belts being provided with stalk engaging and ear removing rollers, means for moving the rollers inwardly as they start on their upward movement, said rollers being adapted to engage under an ear of corn and break the same from the stalk, the other belt moving downwardly in engagement with the stalk, thereby preventing uprooting of the stalk as the rollers break the ears from the same, a conveyor passing longitudinally through the roller carrying belt and so disposed that as the ears are broken from the stalk the same will drop into said conveyor and means whereby power from one of the supporting wheels of the harvester may be utilized as desired to operate the straightening mechanism, the breaking mechanism and to impart a shaking operation to the longitudinal conveyor.

In testimony whereof I have signed my name to this specification in the presence of two subscribing witnesses.

NEWTON VARKER.

Witnesses:
S. E. SMALLEY,
T. E. HENDRICKS.